Nov. 24, 1942.    W. N. WHEELER    2,303,246
EYE OPENING AND CLOSING MECHANISM FOR DOLLS
Filed July 8, 1942    2 Sheets-Sheet 1

Inventor
WILLIAM N. WHEELER

By Clarence A. O'Brien
and Harvey B. Jacobson
Attorneys

Nov. 24, 1942.  W. N. WHEELER  2,303,246
EYE OPENING AND CLOSING MECHANISM FOR DOLLS
Filed July 8, 1942   2 Sheets-Sheet 2
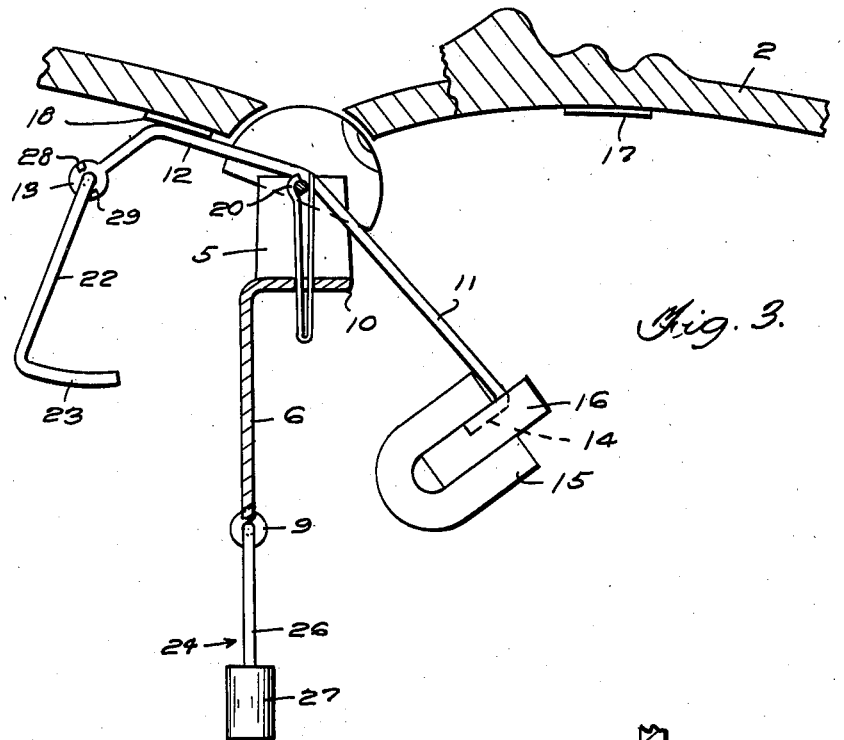
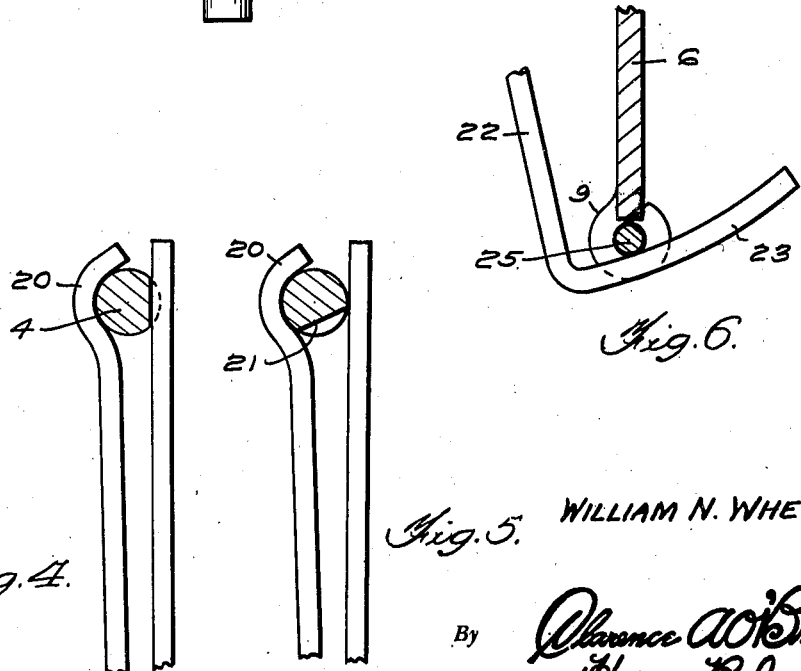
Inventor
WILLIAM N. WHEELER
By Clarence A. O'Brien
and Harvey B. Jacobson
Attorneys Patented Nov. 24, 1942

2,303,246

UNITED STATES PATENT OFFICE 2,303,246

EYE OPENING AND CLOSING MECHANISM FOR DOLLS

William N. Wheeler, Paris, Ky.

Application July 8, 1942, Serial No. 450,168

3 Claims. (Cl. 46—169)

My invention relates to eye opening and closing mechanism for dolls and of the type forming the subject matter of my copending application Serial No. 424,623, filed December 27, 1941, over which the instant invention is designed as an improvement.

The principal object of the present invention is to provide a mechanism of the type disclosed in said application but simplified as regards structure and arrangement of parts, adapted for smoother, quieter operation, and providing for complete opening of the eyes when the doll is held upright without tilting the doll from upright position, and which will operate when the doll is tilted slightly from the horizontal and with the face turned to one side or the other.

Other and subordinate objects are also comprehended by my invention, all of which, together with the precise nature of my improvements, will be readily understood when the succeeding description and claims are read with reference to the drawings accompanying and forming part of this specification.

Figure 1:
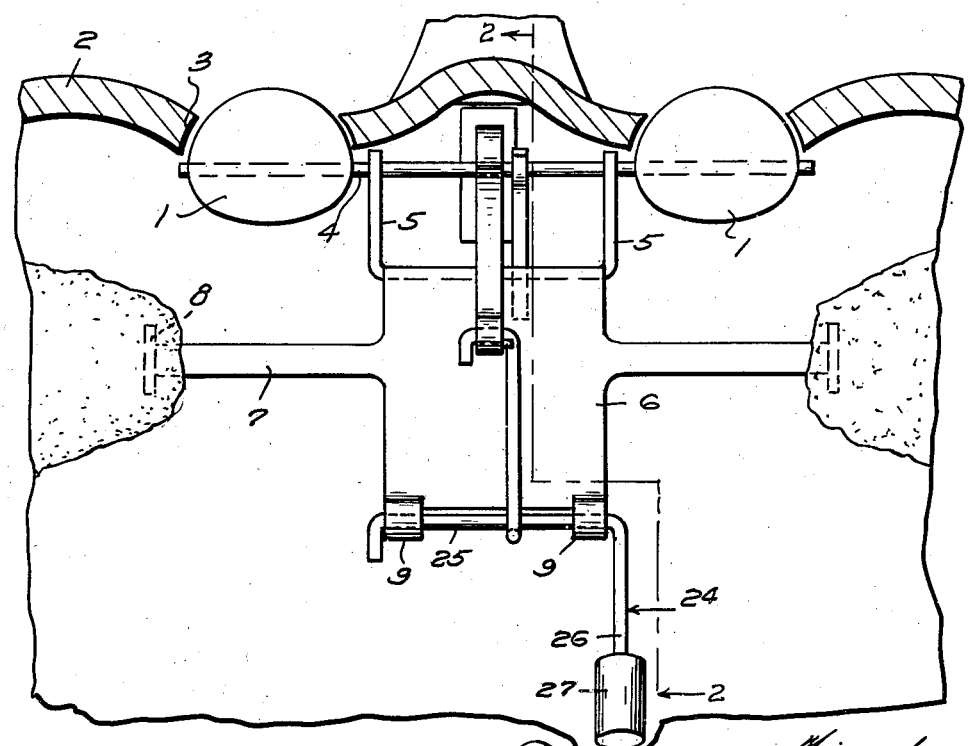
Figure 2:
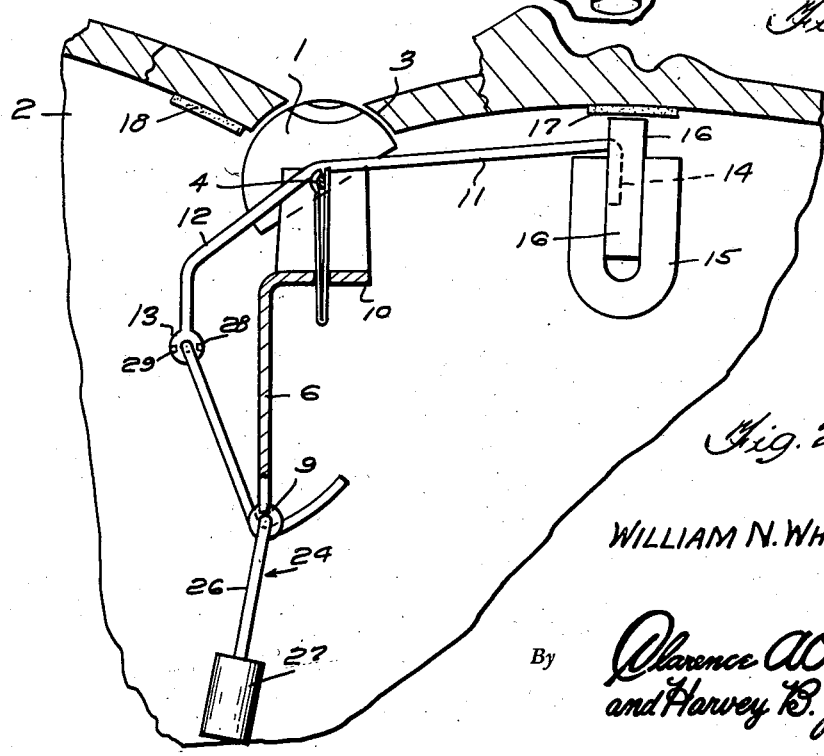

In said drawings:

Figure 1 is a view partly in horizontal section and partly in top plan illustrating my improved eye opening and closing mechanism incorporated in the head of a doll, Figure 2 is a view in transverse section taken on the line 2—2 of Figure 1 and showing the mechanism in eye opening position, Figure 3 is a similar view showing the mechanism in eye closing position, Figure 4 is a detail view of the rock shaft in section and the coacting devices for yieldingly retaining the eye members in eye opening position, Figure 5 is a similar view with the rock shaft rotated to eye closing position, and Figure 6 is a detail view in transverse section taken on the line 6—6 of Figure 1 and drawn to an enlarged scale.

Referring to the drawings by numerals, according to my invention, a pair of eyeball members 1 of semi-cylindrical shape, substantially, are mounted in the head 2 of a doll for vertical oscillation in eye sockets 3 by an eye operating rock shaft 4 extending transversely of the head 2 therein directly behind the eye sockets 3 and having the eyeball members 1 suitably fixed on the opposite ends thereof.

The eye operating rock shaft 4 is journaled intermediate the ends thereof in a pair of laterally spaced ears 5 extending forwardly of the head 2 intermediate the eye sockets 3 from the front edge of a bracket plate 6 extending rearwardly in the head 2 from the ears 5 and transversely thereof with side extensions 7 suitably anchored, as at 8, in the sides of the head 2. The plate 6 is provided with a pair of rearwardly extending corner bearings 9 thereon, and a front downturned flange 10 each for a purpose presently seen.

A shaft operating rocker bar extends transversely and centrally across said rock shaft 4 and which includes a weight carrying free arm 11 extending downwardly in the head 2 and a control arm 12 extending upwardly in said head and equipped with a terminal eyelet forming a bearing 13 for a purpose to be described. Said operating bar is fixed in any suitable manner to the rock shaft 4, as by welding, not shown, and is of angular form such that the arms 11, 12 fit close to the face wall of the head 2 in opposite limits of movement of said bar. The arm 11 has a right angled terminal lug 14 which carries a U-shaped weight 15 spanning said lug and a bumper block 16 of pasteboard or the like, said weight acting as a clip whereby it, together with the block 16, are secured to the lug 14. A pad 17 of felt is suitably secured to the face wall of the head 2 and which is engaged by the bumper block 16 in one limit of movement of said rocker bar 11, 12. A similar pad 18 is secured to said wall of the head 2 for engagement by the arm 12 of the rocker bar in the opposite limit of movement of said bar.

By reference to Figure 2, it will be seen that in the first-mentioned limit of movement of the rocker bar, the rock shaft 4 is positioned to revolve the members 1 into eye opening position. As shown in Figure 3, in the other limit of movement of said bar, said rock shaft 4 is positioned to revolve said members into eye closing position.

Coacting devices are provided on the rock shaft 4 and bracket plate 6 for yieldingly retaining the members 1 in eye opening position and comprising the following:

Suitably fixed in the flange 10 of said plate 6 to extend forwardly therefrom is a spring clip of V shape straddling the rock shaft 4 with its ends frictionally bearing against opposite sides of said shaft, one end being curved, as at 20, to fit over said shaft, and the other end being flat and adapted to bear against a flattened portion 21 on said shaft when the latter is positioned to revolve the members 1 into eye opening position.

The following means are provided for controlling operation of the described rocker bar:

A hook-shaped locking rod 22 is journaled at one end in the bearing 13 of said bar for oscillation about an axis parallel with the axis of the rock shaft 4 and to depend from said bearing. The locking rod 22 is provided with an arcuate free end 23 eccentric to the axis of movement of the rod. A right angled releasing rod 24 is journaled at one end in the bearings 9 of the bracket plate 6 to oscillate about an axis parallel with that of the rock shaft 4 and locking rod 22, the releasing rod embodying a portion 25 extending through said bearings 9, and a portion 26 depending from said portion 25 and equipped at its free end with a weight 27. The rocker bar, locking rod 22 and releasing rod 24 are so proportioned that when the rocker bar is in the limit of movement thereof in which the members 1 are in eye opening position, the end 23 of the locking rod 22 may hook around the portion 25 of the releasing rod 24.

Referring now to the operation, when the doll is held upright, the rocker bar 11, 12 is swung by the weight 15, under the influence of gravity, substantially upright and rocks the rock shaft 4 into position to revolve the members 1 into eye opening position, the block 16 abutting the pad 17 and said shaft and members being yieldingly held against movement out of position in the manner already described. During the swinging of said rocker bar, the free end 23 of the locking rod 22 slides over the bracket plate 6 and over the portion 25 of releasing rod 24 and falls downwardly over the portion 25 of said releasing rod. The members 1 are now yieldingly locked in eye opening position, all as shown in Figure 2. By rocking the doll endwise, in a reclining position, the weighted releasing rod 24 is caused to oscillate in bearings 9. Under such oscillation of the portion 25 of said releasing rod, the arcuate end 23 of the locking rod 22, because of its eccentric relation to its axis of swinging movement, gradually slides rearwardly of the portion 23 of the releasing rod 24, thereby freeing the rocker bar 11, 12. When said rocker bar is thus released, the weighted arm 11 thereof falls and raises the arm 12 of the rocker bar against the felt strip 18 into the second-described limit of movement of said bar, such movement of said bar causing opening of the eyes in a manner which will now be clear. A pair of stop lugs 28, 29 are provided on the bearing 13 upon opposite sides of the locking rod 22, one to pick up said rod when said rocker bar is moved to effect eye opening and move said rod away from bracket plate 6 clear of the same, and both together limiting swinging of the locking arm 22 when it is released. As will be obvious, slow rocking of the doll will result in slow closing of the eyes, and quick rocking of the doll will result in quicker closing of the eyes. Also, the pads 17, 18 provide for noiseless operation in either direction of movement of the rocker bar 11, 12, and the described means for retaining the rock shaft 4 in eye opening position yieldingly, retards the closing of the eyes and checks abrupt fall of the weight 15 so that the eyes close smoothly. When the eyes are opened and the doll held vertical, the described means for yieldingly locking the rock shaft 4 acts to urge the rocker bar 11, 12 into its limit of movement in which the block 16 engages the pad 17.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a doll including a head having eye sockets therein, a pair of eyeball forming members, means to mount said members in said head to project into said sockets comprising a rock shaft having said members fixed upon opposite ends thereof and being operative in opposite directions to rotate said members into eye opening and closing positions, respectively, means to operate said shaft comprising a rocker bar extending across and fixed to said shaft, and having a weighted end whereby when the doll is held in upright position said bar is caused under the influence of gravity to rock in one direction into a limit of movement in that direction, and when the doll is turned into a reclining position said bar is similarly caused to rock in the opposite direction into a limit of movement in said opposite direction, and means to releasably lock said bar in the first-mentioned limit of movement thereof constructed and arranged for operation by oscillation of the doll endwise in reclining position to unlock said bar with a delayed action, said last means including a second rock shaft mounted in said head for oscillating movement, and a coupling on said bar constructed and arranged for coupling to the second rock shaft and gradual uncoupling therefrom under oscillation of said second rock shaft.

2. In a doll including a head having eye sockets therein, a pair of eyeball forming members, means to mount said members in said head to project into said sockets comprising a rock shaft having said members fixed upon opposite ends thereof and being operative in opposite directions to rotate said members into eye opening and closing positions, respectively, means to operate said shaft comprising a rocker bar extending across and fixed to said shaft, and having a weighted end whereby when the doll is held in upright position said bar is caused under the influence of gravity to rock in one direction into a limit of movement in that direction, and when the doll is turned into a reclining position said bar is similarly caused to rock in the opposite direction into a limit of movement in said opposite direction, means to releasably lock said bar in the first-mentioned limit of movement thereof constructed and arranged for operation by oscillation of the doll endwise in reclining position to unlock said bar with a delayed action, and means to frictionally retard rocking of said shaft comprising a resilient clip straddling said shaft and frictionally engaging the same.

3. In a doll including a head having eye sockets therein, a pair of eyeball forming members, means to mount said members in said head to project into said sockets comprising a rock shaft having said members fixed upon opposite ends thereof and being operative in opposite directions to rotate said members into eye opening and closing positions, respectively, means to operate said shaft comprising a rocker bar extending across and fixed to said shaft, and having a weighted end whereby when the doll is held in upright position said bar is caused under the influence of gravity to rock in one direction into a limit of movement in that direction, and when the doll is turned into a reclining position said bar is similarly caused to rock in the opposite direction into a limit of movement in said opposite direction, and means to releasably lock said bar in the first-mentioned limit of movement thereof constructed and arranged for operation by oscillation of the doll endwise in reclining position to unlock said bar with a delayed action, said last means comprising a right angled weighted shaft mounted in said head for oscillating movement, and a locking rod pivoted on said bar for swinging movement and having an arcuate end adapted to hook over said weighted shaft.

WILLIAM N. WHEELER.